United States Patent [19]

Mann et al.

[11] 4,039,043

[45] Aug. 2, 1977

[54] APPARATUS FOR CONTROLLING THE TRAVELING SPEED OF A MOTOR VEHICLE

[75] Inventors: Arnold Mann, Bieber; Ludolf Heimbach, Neuenhain; Horst Schlick, Schwalbach, all of Germany

[73] Assignee: VDO Adolf Schindling AG, Frankfurt am Main, Germany

[21] Appl. No.: 665,312

[22] Filed: Mar. 9, 1976

[30] Foreign Application Priority Data

Mar. 17, 1975 Germany .............................. 2511609

[51] Int. Cl.² .................................................. B60K 31/00
[52] U.S. Cl. ................................ 180/108; 123/103 R; 137/47
[58] Field of Search ............. 180/105 R, 108; 137/58, 137/50, 47; 123/103, 97 R, 102

[56] References Cited

U.S. PATENT DOCUMENTS

| | | | |
|---|---|---|---|
| 3,088,538 | 5/1963 | Brennan | 123/103 R X |
| 3,109,507 | 11/1963 | McMurray | 123/103 R X |
| 3,332,406 | 7/1967 | Perry | 180/108 X |
| 3,340,950 | 9/1967 | Hopengarten | 180/105 R |
| 3,405,779 | 10/1968 | Johnston | 180/108 |
| 3,885,644 | 5/1975 | Seidler | 123/102 X |
| 3,921,751 | 11/1975 | Sakakibara | 123/102 X |

*Primary Examiner*—Joseph F. Peters, Jr.
*Assistant Examiner*—Terrance L. Siemens
*Attorney, Agent, or Firm*—Martin A. Farber

[57] ABSTRACT

An apparatus for controlling the traveling speed of a motor vehicle with an electric control unit acted upon by a speed dependent signal, which unit compares the actual traveling speed with a predetermined desired traveling speed, and upon a deviation transmits a signal, which is dependent on the size of the deviation, to a control stage. The control stage comprises a pneumatic actuator which acts on an element, preferably a throttle valve, which influences the ratio of a fuel-air mixture fed to the motor of the vehicle, as well as two electromagnetically actuatable valves coordinated to the actuator, the valves enabling the actuator to be admitted with reduced- and above atmospheric-pressure, respectively, or normal pressure, respectively. The control stage includes an electromagnetic system having an excitation coil and an armature cooperating therewith. The armature is pivotally mounted for smooth pivoting from a rest position, in which position both of the two valves are closed, against the force of a spring, which force is dependent on the stroke of the actuator, into operating positions, respectively, in which positions one of the two valves is opened and the other valve is closed.

22 Claims, 7 Drawing Figures

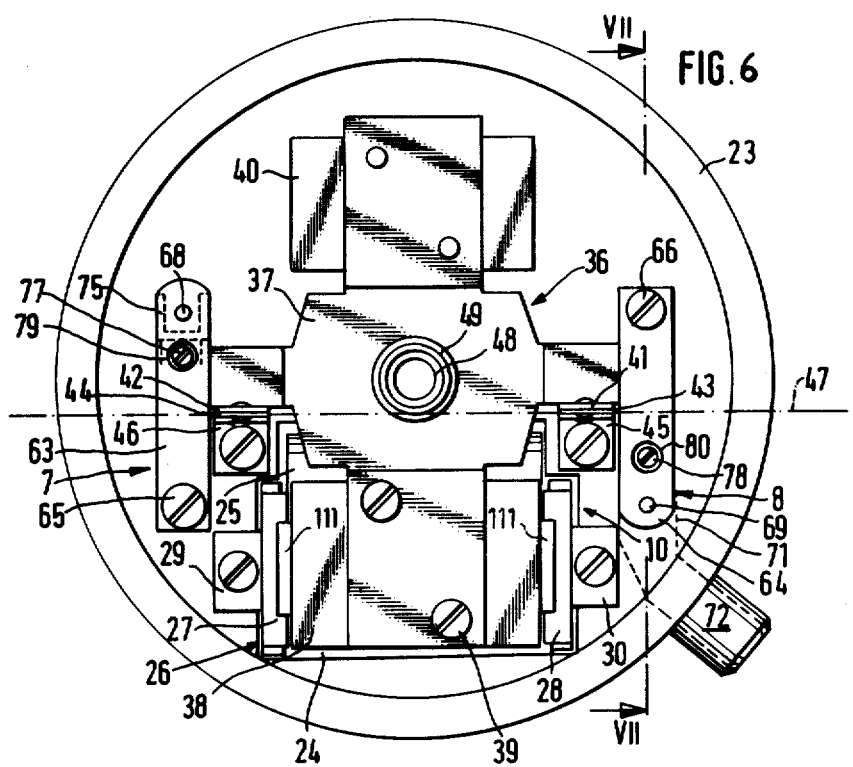
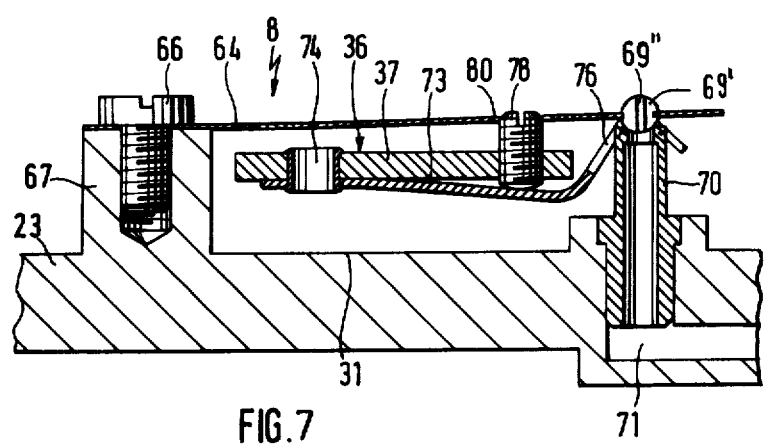

APPARATUS FOR CONTROLLING THE TRAVELING SPEED OF A MOTOR VEHICLE

The invention relates to an apparatus for controlling the traveling speed of a motor vehicle with an electric control unit acted upon by a speed dependent signal, which unit compares the then present traveling speed with a predetermined desired traveling speed, and upon a deviation transmits a signal which is dependent on the size of the deviation to a control stage. The control stage comprises a pneumatic actuator acting on an element, preferably the throttle valve, which influences the ratio of the fuel-air mixture fed to the motor of the vehicle, as well as two electromagnetically actuatable valves coordinated to the actuator. By means of the valves the actuator is enabled to be admitted with reduced- and above atmospheric- pressure, respectively, or normal pressure, respectively.

With one known device for the control of the traveling speed of a motor vehicle, there is present an electrical control unit which compares the actual speed of the motor vehicle with a nominal speed which was preset by the operator of the vehicle, and upon a deviation of the two travel speeds a signal is transmitted to a control stage which controls a pneumatic actuator acting on the throttle valve. The actuator comprises a chamber which is closed on one side with a roll membrane coupled with the throttle valve. The control stage coordinated to the actuator includes two magnetic valves seated in the chamber wall of the actuator which are controlled by the electrical control unit. Over one of the magnetic valves, the chamber of the actuator can be brought in communication with the ambient air, that is, the air surrounding the vehicle, and over the other magnetic valve it can be brought in communication with the carburetor intake manifold, and as a consequence of this, it communicates and is admitted with the there prevailing reduced pressure. If the actual speed of the motor vehicle is above the nominal speed, the chamber is supplied with air and the actuator actuates the throttle in the sense of a speed reduction. If to the contrary, the actual speed is below the nominal speed, then the other magnetic valve is actuated and the chamber is admitted with reduced pressure, whereby the throttle valve is adjusted in the sense of a speed increase.

Such a type of construction of the control apparatus has considerable disadvantages. Thus an electric control unit with two signal outputs for controlling both of the magnetic valves must be used, which has the consequence of an increased circuitry and an increased component expense, and thus increased manufacturing costs, compared to an electrical control unit with only one signal output. Moreover, on the basis of the reduced pressure fluctuations in the intake manifold, the stroke change of the roll membrane is dependent on the deviation of the actual speed from the nominal speed, as well as on the level of the then prevailing reduced pressure. In order to eliminate this dependency of the stroke change of the membrane on the reduced pressure, with the known apparatus there is provided an electric measuring device which determines the stroke change, the output signal of which is fed to the electrical control unit, the latter providing a corresponding correction. By these indispensible measures for an unobjectionable control, the manufacturing costs of the device are additionally increased.

It is an object of the present invention to overcome these disadvantages. It is thus another object of the invention to provide a control device which has a simple construction and with a reduced number of components, and is as inexpensive as possible. Moreover, it should be able to be installed quickly and without difficulty in the motor vehicle.

These objects are solved in accordance with still another object of the invention with a device of the introductory mentioned type, in the manner that the control stage comprises an electromagnetic system with an excitation coil and an armature which is pivotable jerkfree or smoothly from a rest position (in which both valves are closed) against the force of a spring (e.g. 50), which force is dependent on the stroke of the actuator, into the operating positions, in which operating positions, respectively, one of the two valves is opened and the other valve is closed.

With such an electromagnetic system the electric control unit can be used with a single output signal. Further, with such a control stage no dependency of the actuator stroke on the reduced pressure occurs, since a balance is set or adjusted for every speed value within the speed control range on the basis of a path comparison, by which balance, when it is attained, no (or possibly a very small) pressure medium consumption occurs in the control stage. In this manner there exists the possibility of connecting the device to a pressure medium reservoir, for example to a reduced pressure container used for a reduced pressure door locking system, the device thus being able to operate independently of the reduced pressure in the intake manifold, whereby the control range may be expanded almost to the highest speed of the vehicle. This advantage is especially effective with motor vehicles having an exhaust gas purification or anti-pollution unit, since with this on the intake manifold, a still smaller reduced pressure occurs in comparison to the prior conventional motor vehicles which are driven without an exhaust gas purification unit, — and inasmuch as an operation of the control device over a pressure medium reservoir is practically indispensible if an undesired smaller speed control range is not accepted. A further advantage of the device of the invention is that, since there is present only a single element (the excitation coil) which is controllable by the electrical control unit, and no measuring device is required for determining the stroke change of the actuator, merely a 2-core cable is necessary between the electronic part of the control unit and the electromagnetic system, the latter generally being arranged at a remote control position In order to achieve a smooth jump-free pivoting of the armature it is most suitable to construct the electromagnetic system as a U-shaped yoke (26) carrying the excitation coil (25) and with an armature cooperating with the leg front sides of the yoke, and between the armature and the yoke to provide a sheet or plate spring (111) which is arched toward or against the armature, the plate spring being supported with its ends on the leg front sides. By means of such a plate spring, the armature is prevented from striking impact-like in its end position in the event of going below a minimum spacing between itself and the front sides of the legs. Another possible embodiment resides in providing, as an electromagnet system, a U-shaped yoke carrying the excitation coil and an armature submerging or insertable between the legs, and to select the rest position range of the armature such that which an energized yoke, there occurs between the yoke and the armature approximately the maximum pulling force, which force is dependent on the insertion depth. This embodiment form has relative the first described form, the advantage that a construction is provided with a reduced number of components and the efficiency is considerably advantageous.

For the valves, per se conventional units can be selected, whereby with respect to a non-objectionable control and a lowest possible total current consumption of the control device, valves are preferred which are actuatable with a reduced force expenditure. Such values having a closing member which is provided with a pressure relief or discharge slot have proven particularly advantageous. A certain disadvantage of such valves is a little pressure medium consumption during the balanced condition. According to a further concept of the invention, this disadvantage can be avoided by providing or coordinating a rest position range to the armature, and feeding the excitation coil with a low frequency current which throws the armature into vibration. With such an embodiment, the closing member does not slowly creep open, but rather breaks or snaps open. The result is that for the actuation of the valves already comparatively small forces are sufficient and tight closing or sealing valves can be used without negatively influencing the non-objectionable operation of the control unit and its total current consumption.

Apart or independent therefrom, if valves are used having a pressure discharge slot, or valves without same, which valves are actuated by an armature which is thrown into vibration, it has proven advantageous to provide valves which comprise a valve body having a passage opening and a substantially ball-shaped closing member which is fastened on a plate spring, the latter under pre-tension pressing the closing member on the valve body. These valves have the advantage, compared to those with a closing member guided in the valve body, that on the one hand they operate service-free (this particularly when the closing member is made of a rubber elastic material) and on the other hand they operate non-objectionably in a wide temperature range. The latter is not the case with the valves which have a closing member guided in the valve body.

For an exact adjustment of the opening- and closing-points of the valves in dependency on the position of the armature, most advantageously, a bracket abuts or engages on each plate spring, which bracket is secured on the armature and is adjustable relative to the armature with its end projecting against the plate spring. Of particular advantage is the formation of the bracket end (at the plate spring side) in the shape of a fork, whereby both of the parts of the fork rest on or contact the plate spring in the range of the closing member. In this way, a safe positive vibration- or fluctuationfree actuation of the closing member is guaranteed. It has proven advantageous for the adjustment of the bracket with respect to the armature, to provide a screw disposed in a threaded bore of the armature, acting against the center part of the bracket.

In order to prevent the entire mechanical system for vibrating or oscillating when supplying the excitation coil with current pulses, it is recommended to select the frequency of the current outside of the characteristic frequency range of the system which includes the armature, the actuator spring and the valve return springs.

The supplying or feeding of the excitation coil takes place most advantageously with a pulse series having a pulse period which at least changes in dependency on the traveling speed. Per se the electromagnetic system can also be operated with a pulse series of constant pulse period and with an amplitude which is variable in dependency on the traveling speed, yet for the production of such a current, costly means and measures are necessary. On these bases one selects a pulse series varying in its pulse period having pulses of constant width, and not with constant frequency.

According to a further concept of the invention, the pulse period changes additionally in dependency on the variations of the electrical value or quantity of the electromagnetic system and/or of the operating voltage. This brings about the advantage that, for example, temperature or production conditioned variations in the inductivity of the excitation coil, or fluctuations of the operating voltage, all can be compensated and as a result of this, the control device operates without objection and precisely, even with a change of these quantities.

With a device with a control unit, in which a positive reference potential occurs in the output thereof in the adjusted condition, this pulse period change can be advantageously attained by providing a comparator (12) having one input connected with the output of the control unit (1, 2, 3, 4) and another input connected with a stage (13) which measures the average value of the current flowing through the excitation coil (25), and to the output of the comparator there is connected an electronic switch (14) disposed in the excitation circuit, and which comparator is wired such that the pulse period of its output signal is set or determined by its two input signals. This wiring can take place for example in the manner that the comparator input (which is coordinated to the stage (13) detecting the average value of the current) is connected directly with the comparator output, and that the comparator input (which is connected with the control unit) is connected over a differentiating RCsection with the comparator output, which in turn is connected to the operating voltage source via a resistor.

The stage (13) measuring the average value of the current most advantageously comprises a resistor (15) disposed in the excitation coil circuit and a transistor (17) controlled by the voltage drop of the resistor, the transistor's output circuit (containing a rectifier (16) ) being in operative connection with that input of the comparator which is coordinated to the stage.

In order to achieve a simplest construction having a reduced number of components, it is recommended to equip the armature with a balance or equalization weight. In this manner, a spring element resetting or readjusting the armature and means for adjusting the spring force or operative resiliency of the element as well as the time for assembling the element and the adjustment can be economized. The equalization weight is most suitably constructed in the form of a damper vane. In this manner it can be simply attained that the characteristic resonance of the system which comprises the armature, actuator spring and valve return springs lies in a frequency range which permits the frequency of the pulse current to be selectable substantially in accordance with a circuit detail viewpoint.

In a preferred embodiment the electromagnetic system (10) is arranged on the inside of one of the two front walls (31) of the actuator (6) and the valves (7, 8) are disposed in this front wall (31). In this way a particularly compact and space-savings construction is achieved for the device.

Particularly with a pressure medium producer which delivers a comparatively small quantity of pressure medium per unit time, it can occur that with frequent changes of the input values of the control unit, an unobjectionable control is no longer guaranteed. In order to prevent this, it is most advantageous for the pressure medium which stands under above-atmospheric pressure or reduced pressure, for there to exist a pressure reservoir which is connected between the actuator and the pressure medium producer or supply. In a preferred embodiment the separating wall which carries the electromagnetic system transfers on its outer side into a chamber forming the pressure reservoir. In this manner a particularly compact and space-saving construction is provided. On the same basis, with a device with a positioning or regulating element (having a roll membrane), for guiding the roll membrane (which membrane is connected with the element which influences the fuel-air mixture), there is provided a guide tube which is closed on one side and projects into the chamber which serves as the pressure reservoir, in which guide tube a guide rod is displaceably mounted, the guide tube being secured on the roll membrane. The use of a pressure reservoir coordinated to the actuator is recommended on the basis of safety or security, and moreover also when there is already present another system, such as, for example, a reduced pressure door closing system, with a pressure medium supplying pressure reservoir.

With the above and other objects and advantages in view, the present invention will become more clearly understood in connection with the following detailed description of preferred embodiments of the invention when considered with the accompanying drawings, of which:

FIG. 6 is a view similar to FIG. 3 but of the embodiment of FIG. 5; and

FIG. 7 is a section taken along the lines VII — VII of FIG. 6 and showing an embodiment of a closure member having a pressure discharge slot.

Figure 1:
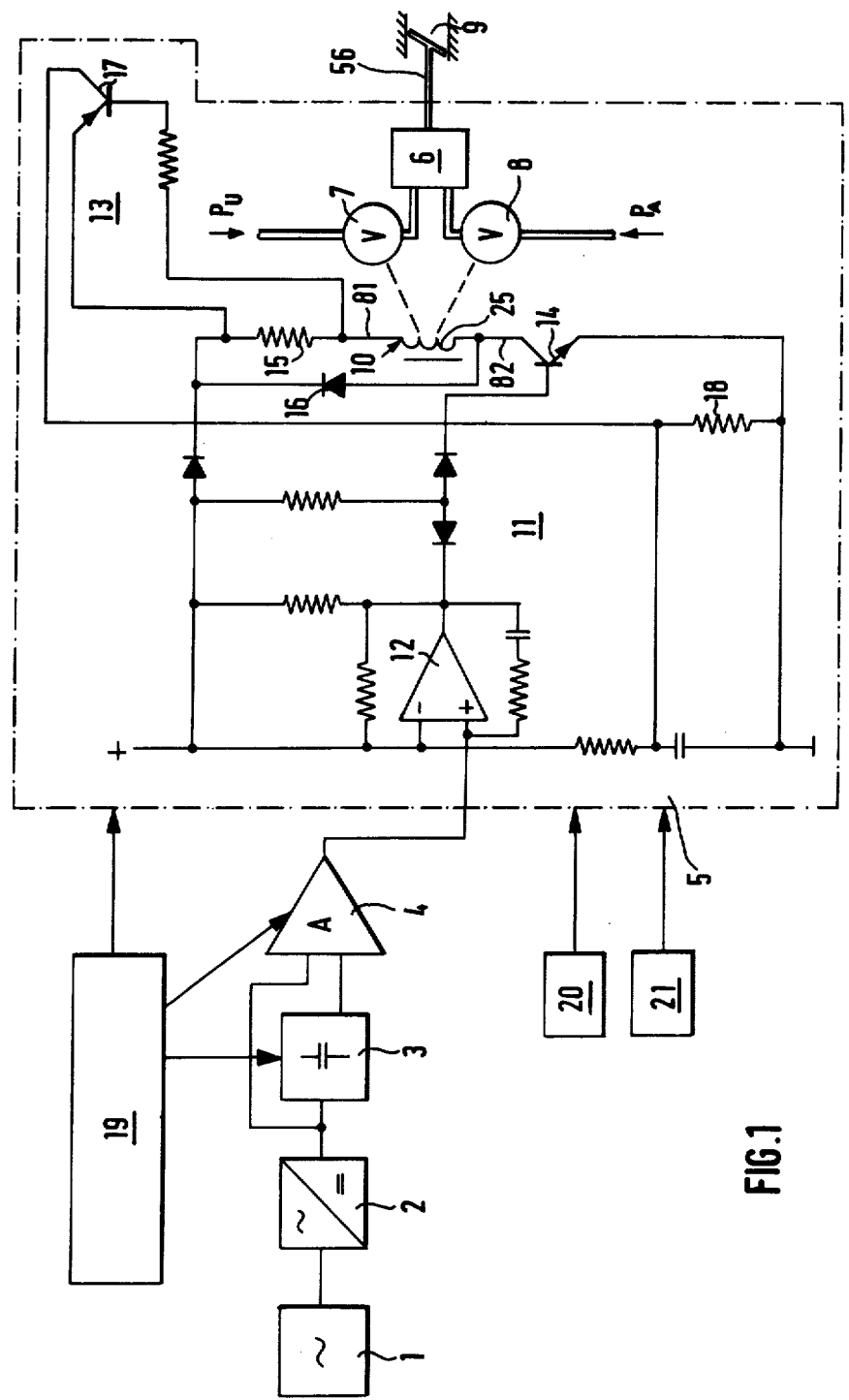
FIG. 1 is a schematic circuit diagram of a device with a control stage and an actuator in accordance with the present invention.

Referring to the drawings, as evident from FIG. 1, a driving or traveling speed control device includes: a speed pick-up or transmitter 1, the output signal of which has a frequency proportional to the traveling speed of the vehicle; a frequency-voltage-transformer 2 connected to the transmitter 1, the output signal of the transformer 2 being fed in one path indirectly to a differential amplifier 4 via a storage or memory unit 3 and in another path directly to the differential amplifier 4, the latter comparing therein the instantaneous actual value of the speed with a speed nominal value. In the case of a deviation of the actual value from the nominal value, the potential in the comparator output is raised or lowered, the latter being connected with a control stage 5.

The control stage 5 includes a pneumatic actuator 6, which is coupled by means of two valves 7 and 8 admissible or operatively in communication with a reduced pressure or a partial vacuum $P_u$ and with the ambient air $P_A$, respectively, the actuator 6 also being coupled to the throttle valve 9 on the motor of the vehicle. An electromagnetic system 10 is provided for the actuation of the valves 7 and 8, the system 10 being disposed in a control circuit 11.

The control circuit 11 of the control stage 5 comprises essentially a comparator 12 having one input connected with the output of the differential amplifier 4 and another input connected with the output of a stage 13, which stage 13 produces a signal proportional to the average value of the current flowing through the electromagnetic system 10. The output of the comparator 12 controls a transistor 14 or a transistor combination, the transistor 14 or the transistor combination, respectively, being disposed in the supply or feed circuit of the electromagnetic system 10. The comparator 12 is wired such that it emits current pulses of constant width, the pulse period of which is determined by its two input signals (the signal which is proportional to the deviation of the actual value of the speed from the nominal value, and the signal which is proportional to the average value of the current flowing through the electromagnetic system 10).

For the detection of the average value of the current flowing through the electromagnetic system 10, a resistor 15 is connected in the supply line. The voltage drop occurring on this resistor 15 controls a transistor 17, in the output circuit of which there is disposed a rectifier diode 16 and a resistor 18. One of the inputs of the comparator 12 is controlled by the voltage drop occurring across the resistor 18. By such a control circuit, not only can a control current be produced which throws the moveable mechanical part of the electromagnetic system 10 in vibration, but rather also a temperature- and manufacture conditioned change in the electromagnetic system is compensated during its operation.

The control of the entire control device is brought about by means of a control or operating unit 19 (containing a switch to be operated by the vehicle operator) on the basis of the traffic conditions, as well as by the brake light switch 20 and, under circumstances if need be, a switch 21 in operative connection with the clutch of the vehicle. If the vehicle operator desires an automatic control of the traveling or driving speed at a predetermined set value, upon reaching the traveling speed value he quickly actuates a switch in the control unit 19, whereby the instantaneous driving speed is stored in the memory unit 3.

As a result a set or determined voltage signal corresponding to the stored speed is provided at one input of the differential amplifier 4 which then compares this voltage signal with its other input signal, the latter corresponding to the actual driving speed. If a difference between both values occurs, for example, where the vehicle arrives at an upgrade and its speed is reduced, thus the output signal of the differential amplifier 4 changes, and as a result, also the current flowing through the electrical part of the electromagnetic system 10, whereby the positioning or regulating element 6 is actuated. The result is that the latter is admitted and communicates with a reduced pressure and the throttle valve 9 is pivoted in the sense of an acceleration of the motor vehicle. It is similar if a difference between the speed nominal value and the actual valve of the speed occurs with an acceleration of the vehicle, for example on a downgrade. Upon applying the brake or the clutch of the vehicle, the control device is inoperatively switched out. By actuation of the appropriate relevant switch on the control or operating unit 19, without touching the gas pedal or the brake, the vehicle can be accelerated to a higher speed or can be slowed down to a reduced speed, respectively, furthermore, which speed thereafter can be maintained automatically. Likewise there exists the possibility after switching off of the control device, to again turn the control device on by actuation of a relevant switch in the control unit 19, which accelerates or brakes the vehicle to the nominal speed which was set or adjusted before the switching-off, thus again assuming a previously set nominal speed. The operation corresponds thus somewhat basically to the known devices. Further, means are provided as in the known devices, to switch-off the control device when the vehicle speed falls below a minimum speed or when the vehicle nominal speed goes down by more than a predetermined set amount. The latter, for example, can be effective with inclinations or upgrades which can not be handled in the chosen course.

Contrary to the known devices, the device according to the present invention includes means which prevent the voltage fluctuations or variations in the supply system of the vehicle and the temperature conditioned changes and other changes in the electrical circuit of the electromagnetic system 10 from affecting the control. If the voltage of the supply system also is reduced for any reason, with the known device this always leads to a change in the speed of the vehicle. However to the contrary, with the present invention, the current reduction - produced by the supply system reduction - in the electronic circuit of the electromagnetic system 10 is detected on the resistor 15 and the comparator 12 is controlled via the stage 13, and thereupon the pulse period of its output signal is reduced to such an extent that the current change in the electric circuit of the electromagnetic system 10 is compensated. Consequently a change in the speed of the vehicle does not occur.

Figure 2:
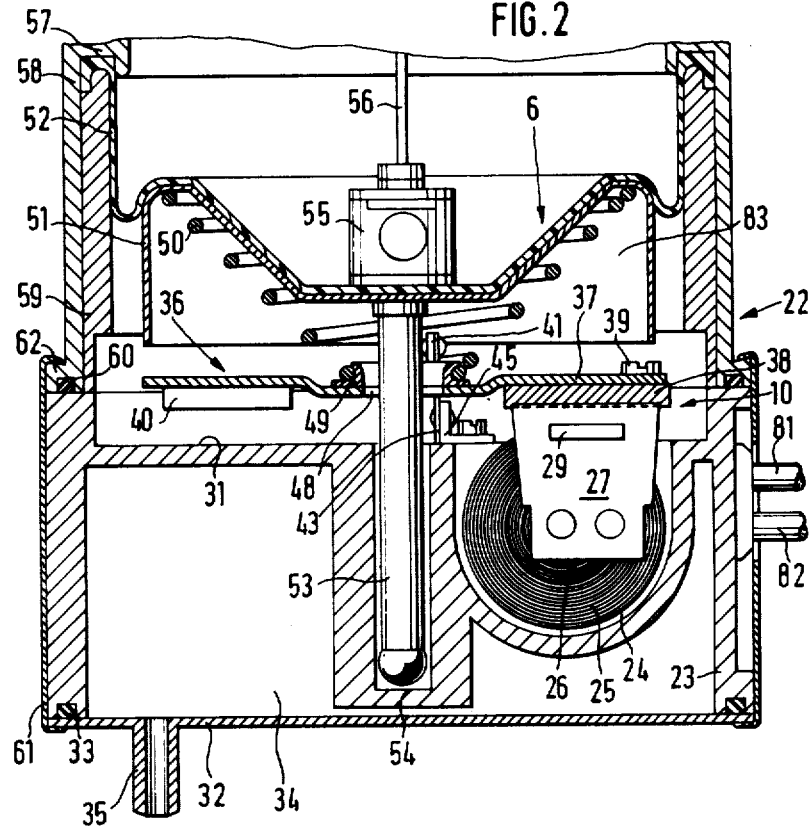
FIG. 2 is a longitudinal section through the control stage of the device of FIG. 1, which control stage forms a unit with the actuator.
Figure 3:
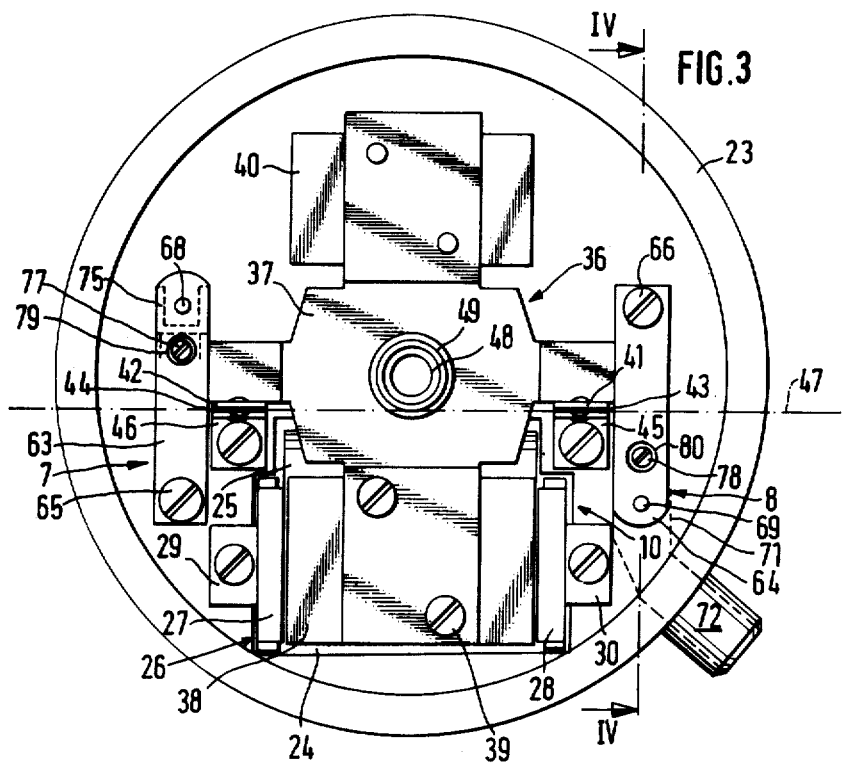
FIG. 3 is a view of the control stage of the device in accordance with FIG. 1, with the actuator removed.

FIGS. 2 and 3 illustrate the actuator drive 6 with the valves 7 and 8, the actuator 6 forming a construction unit with the electromagnetic system 10 of the control stage 5. The construction unit 22 comprises a first housing part 23 forming a chamber 24 for the excitation coil 25 of the electromagnetic system 10. The excitation coil is seated in a yoke 26, the latter having two legs 27 and 28, each provided with a projection 29 and 30, respectively, which serve to secure the yoke 26 on the front side 31 of the housing part 23. The end of the housing part 23 opposite the front side 31 is closed with a cover 32, between which cover and the housing part there is arranged a sealing ring or gasket 33. The space bounded by the housing part 23 and the cover 32 forms a pressure reservoir 34, which is admitted with a reduced pressure via a connection conduit 35 disposed in the cover 32.

An armature 36 of the electromagnetic system 10 is articulated on the front side 31 of the housing part 23. The armature 36 comprises a four-armed main part 37, on one arm of which, by means of two screws 39 there is fastened an armature plate 38 which is lowered or inserted between the two legs 27 and 28 of the yoke 26. On the arm of the armature which is opposite to the arm carrying the plate 38 there is riveted an equalization or balancing weight 40. The end of each of the two other arms opposite one another, operates one of the two valves 7 and 8 and each of these arms on its longitudinal side has an angled or bent projection 41 and 42, respectively, extending therefrom. On each projection 41 and 42, respectively, there is riveted a flat plate spring 43 and 44, respectively, the other end of which spring is riveted on an angle 45 and 46, respectively, which angles are screwed onto the front side 31 of the housing part 23. As a result, the armature 36 is pivotable about the lateral axis 47. The main part 37 of the armature 36 is formed with a central opening 48 and carries an L-shaped cross-section retaining ring 49, which is arranged concentric to the opening 48 and which serves for centrally fixing an actuator spring 50.

The other end of the conically shaped actuator spring 50 is supported on the bottom of a sheet metal pot 51, the latter being provided for supporting a roll membrane 52. A guide rod 53 is fastened in the center of the sheet metal pot 51, the guide rod 53 projecting in a guide tube 54 formed in the housing part 23. A holder 55 is disposed on the other side of the sheet metal pot 51, the holder likewise being fastened centrally on the pot 51, the roll membrane 52 clamping on the pot 51. A pulling or traction cable 56 engages or grips on the holder 55, the cable 56 being connected with the throttle valve 9.

The roll membrane 52 is clamped on its edge between a shoulder 57 on a second pot-shaped housing part 58 of the construction unit 22 and a tubular shaped insert 59 forming the support abutment. The insert 59 as well as the front edge of the housing part 58 are supported on the front edge of the housing part 23. The sealing of the junction point is provided by means of a sealing ring 60 which is disposed in a groove in the front edge of the housing part 58. Both of the housing parts 23 and 58, as well as the cover 32, are connected with one another by means of a sheet metal ring 61 which is flanged on both ends engaging on the cover 32 on the one hand and gripping behind an outer collar 62 on the housing part 58 on the other hand. The pulling cable is guided out through an opening in the not illustrated bottom of the housing 58.

Figure 4:
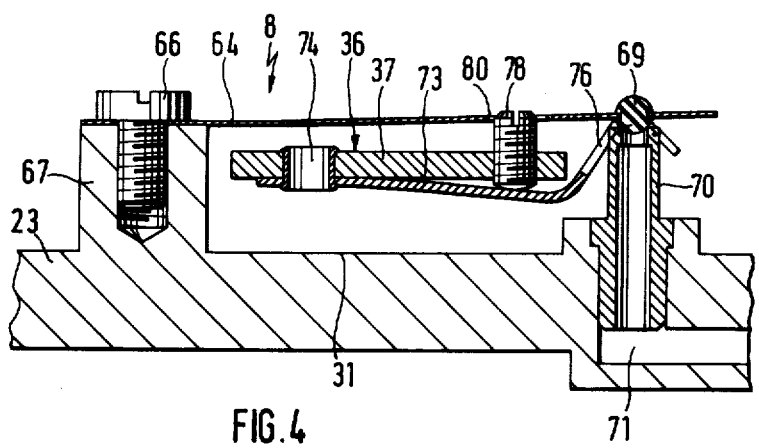
FIG. 4 is a section taken along the line IV—IV of FIG. 3 through the control stage of the device according to FIG. 1, in enlarged view.
Figure 5:
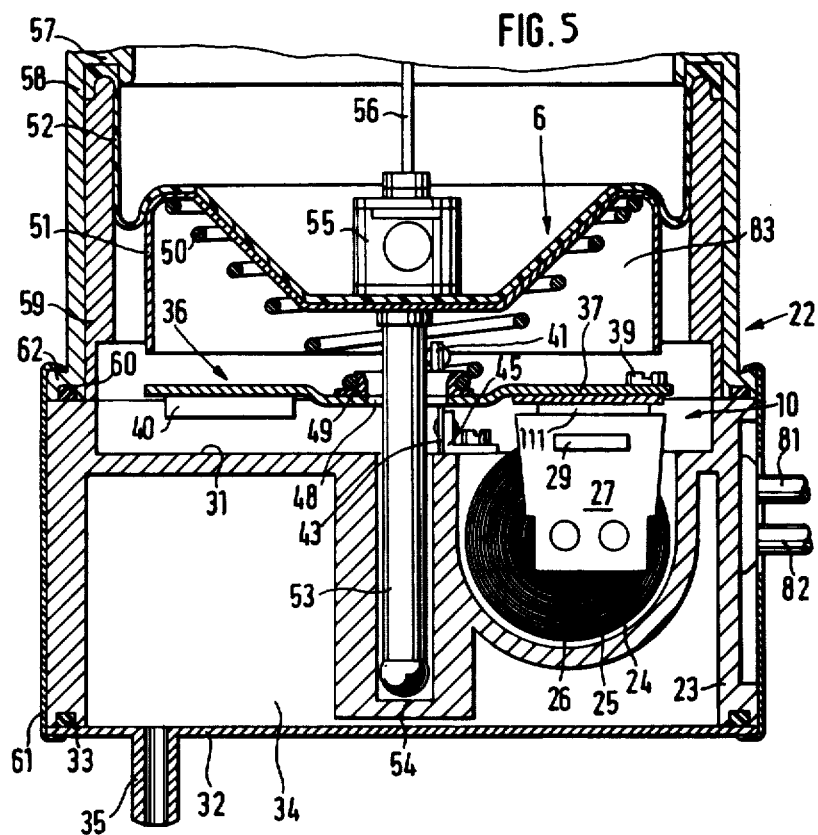
FIG. 5 is a view similar to FIG. 2 showing an embodiment having a plate spring between the armature and the yoke.

Both of the valves 7 and 8 are principally constructed alike. Each of the two valves 7 and 8 comprises a plate spring 63 and 64, respectively, which is secured on one end by means of a screw 65 and 66, respectively, each on a pin 67 formed on the front side 31 of the housing part 23, and on its other end carries a closure or sealing member 68 and 69, respectively, made of a soft rubber elastic material. The closure member 68 and 69, respectively, is pressed by the plate spring 63 and 64, respectively, the plate springs being held prestressed, in a direction against the valve body 70, the latter being seated in the front wall 31 of the housing part 23, as may be clearly seen in FIG. 4. The valve body 70 of the valve 8, via a channel 71 and a connection feed pipe 72 formed on the housing part 24, stand in communication with the ambient air, while the not shown valve body of the valve 7 opens into the pressure reservoir 34. Each of the two plate springs 63 and 64, respectively, is in connection over a bracket 73 with the main part 37 of the armature 36, one end of the bracket 73 being secured to the armature 36 by means of a rivet 74. The other end of the bracket transforms into a fork 75 and 76, respectively, the two parts or prongs of each fork, at both sides of the closure member 68 and 69, respectively, engage or abut on the plate spring 63 and 64, respectively. For adjustment or setting of the relative position between the bracket end operating the closure member 68 and 69, respectively, and the main part 37 of the armature, in the armature main part 37 there is provided a set-screw or headless screw 77 and 78, respectively, acting on a non-clamped part of the bracket, which screw is manipulated with a screw driver through a recess 79 and 80, respectively, in the plate spring 63 and 64, respectively. FIG. 7 shows an embodiment with the closure member 69' formed with a pressure discharge slot opening 69". FIGS. 5 and 6 show an embodiment with a plate spring 111 arched against the armature plate 38 with ends of the spring supported on the front sides of the legs 27 and 28 of the yoke 26. Like numerals in all views are like parts.

The control stage 5 according to FIGS. 1–4, is illustrated in the balanced condition, that is the pulling or drawing force exerted on the armature 36 by the yoke 26 is in equilibrium with the pulling force exerted by the reduced pressure or partial vacuum on the roll membrane 52, which latter force acts on the armature via the actuator spring 50. In this condition, the armature 36, which vibrates as a result of the pulse current flowing through the excitation coil 25, is in its rest position range and both valves 7 and 8 are closed. A pressure medium consumption does not occur. If now the actual speed of the vehicle increases, for example where the vehicle arrives on a street portion with a downgrade, thus the pulse period of the series of pulses emitted from the comparator 12 increases, which signifies that, since the pulses have a constant width, the number of the pulses per unit time decreases and consequently the average value of the current flowing through the lines 81 and 82 and the excitation coil 25 is reduced. This has the result that the pulling force exerted by the yoke 26 on the armature 36 becomes smaller and as a result the armature plate 38 emerges out of the space between the two legs 27 and 28. In this manner, the valve 8 opens and ambient air flows into the chamber 83 formed by the front side 31 of the housing part 23, the housing part 58 and the roll membrane 52. This causes a reduction of the pulling force exerted by the reduced pressure or partial vacuum on the roll membrane 52, and the roll membrane 52 migrates or creeps upwardly. Thereby the throttle valve 9 is pivoted by means of the pulling cable in the sense of a speed reduction, and simultaneously the force acting on the armature plate 38 by means of the actuator spring 50 is reduced. This results in a pivoting back of the armature plate 38 in the direction toward its rest position range, until the above described equilibrium condition is again attained.

If now the actual speed of the vehicle again reduces, for example because the vehicle arrives on a level road part, this reduces the pulse period of the series of pulses emitted from the comparator 12, which leads to an increase of the average value of the current flowing through the excitation coil 25. The armature plate 38 is thus drawn deeper between the two yoke legs 27 and 28, and thereby pivoting the armature 36 such that the valve 7 is opened. The chamber 83 is admitted with and communicates with the reduced pressure in the reservoir 34 via the opened valve 7, and the roll membrane 52 migrates downwardly. In this manner, the force acting on the armature 36 by the actuator spring 50 increases, so that the armature 36 is pivoted in the direction of its rest position range. When it reaches its rest position, the above described equilibrium condition prevails. The corresponding occurs when the vehicle is to be brought to a higher or lower speed without hitting the gas pedal or the brake by actuation of the appropriate switch in the operating or control unit 19. In this manner the stored nominal speed changes by actuation of the corresponding switch.

We claim:

1. An apparatus for controlling the traveling speed of a motor vehicle with an electric control unit acted upon by a speed dependent signal, which unit compares the actual traveling speed with a predetermined desired traveling speed and upon a deviation transmits a signal which is dependent on the size of the deviation to a control stage which acts on an element, preferably a throttle valve, which influences the ratio of a fuel-air mixture fed to a motor of the vehicle, comprising
    a control stage including anactuator means performing a stroke and for actuating the element,
    two electromagnetically actuatable valve means operatively coordinated to said actuator means for admitting said actuator means with reduced pressure and normal pressure, respectively,
    said control stage further comprising an electromagnetic system having an excitation coil and an armature means operatively cooperating therewith,
    spring means for biasing said armature means and having a spring force dependent on the stroke of said actuator means,
    said armature means being pivotally mounted for smooth pivoting from a rest position in which both of said two valve means are closed, against the force of said spring means into operating positions, respectively, in which one of said two valve means is opened and the other of said two valve means is closed.

2. The apparatus, as set forth in claim 1, wherein said electromagnetic system includes a U-shaped yoke carrying said excitation coil, said yoke has legs defining leg front sides, said armature means cooperates with said leg front sides of said yoke, and a plate spring arched against said armature means disposed between said armature means and said yoke, said plate spring has ends and is supported with said ends on said leg front sides.

3. The apparatus, as set forth in claim 1, wherein said electromagnetic system includes a U-shaped yoke carrying said excitation coil, said yoke has legs, said armature means is submergable between said legs, said rest position of said armature means constitutes, with said yoke energized, a position having substantially a largest pulling force between said yoke and said armature means, the force being dependent on the submerged depth.

4. The apparatus, as set forth in claim 1, wherein said valve means each include a closure member having a pressure discharge slot.

5. The apparatus as set forth in claim 1, wherein said rest position constitutes a rest position range associated with said armature means, and means for feeding said excitation coil with a low frequency current for vibrating said armature means.

6. The apparatus, as set forth in claim 5, wherein said valve means each include a valve return spring, said spring means constitutes a actuator spring, the frequency of said current is outside of the characteristic frequency range of a system constituting said armature means, said actuator spring and said valve return springs.

7. The apparatus, as set forth in claim 5, wherein said current contitutes a pulse series having a pulse period which varies at least in dependency on the traveling speed of the vehicle.

8. The apparatus, as set forth in claim 7, wherein said pulse series comprises pulses of constant width.

9. The apparatus, as set forth in claim 7, wherein the pulse period further varies in dependency on changes of the electric value of said electromagnetic system and/or of an operating voltage.

10. The apparatus, as set forth in claim 7, further comprising
- a control unit means having an output for providing in a set condition a positive reference potential at the output,
- stage means for measuring an average value of current flowing through said excitation coil,
- an excitation circuit includes said excitation coil,
- an electronic switch disposed in said excitation circuit,
- a comparator means having one input connected with the output of said control unit means and another input connected with said stage means,
- said electronic switch is connected to the output of said comparator means, and said comparator means is wired such that a pulse period of its output signal is set by its two input signals.

11. The apparatus, as set forth in claim 10, wherein said stage means comprises a resistor disposed in said excitation circuit and a transistor means for being controlled by a voltage drop of said resistor, an output circut of said transistor means contains a rectifier, said output circuit of said transistor means is in operative connection with said another input of said comparator means.

12. The apparatus, as set forth in claim 5, further comprising an equalization weight disposed on said armature means.

13. The apparatus, as set forth in claim 12, wherein said equalization weight has the form of a damper vane.

14. The apparatus, as set forth in claim 1, wherein each of said two valve means comprises a valve body having a passage opening and a substantially ball-shaped closure member, plate spring means for pressing said closure member under pretension on said valve body, said closure member is fastened to said plate spring means.

15. The apparatus, as set forth in claim 14, wherein said closure member is made of an elastic rubber material.

16. The apparatus, as set forth in claim 15, further comprising a bracket having an end projecting engagingly against each of said plate spring means, said bracket is fastened to said armature means, said end is adjustable relative to said armature means.

17. The apparatus, as set forth in claim 16, wherein said end of said bracket is formed in a shape of a fork having two parts, said two parts rest in a range adjacent of said closure member.

18. The apparatus, as set forth in claim 16, including means for adjusting said bracket with respect to said armature means comprising a screw disposed in a threaded bore formed in said armature means and acting against a center part of said bracket.

19. The apparatus, as set forth in claim 1, wherein said actuator means includes two front walls defining an inner side, said electromagnetic system is arranged on said inner side of one of said two front walls of said actuator means and said two valve means are disposed in said one of said two front walls.

20. The apparatus, as set forth in claim 1, further comprising pressure reservoir means for providing a pressure medium standing at lower than atmospheric pressure, said pressure reservoir means is operatively connected between said actuator means and a pressure medium producer.

21. The apparatus, as set forth in claim 19, wherein said one of said front walls has an outer side and transfers into a chamber constituting a pressure reservoir on said outer side.

22. The apparatus, as set forth in claim 21, further comprising a regulating element having a roll membrane, the latter adapted to be connected with the element which influences the fuel-air mixture, guide tube means for operatively guiding said roll membrane, said guide tube means is closed on one end and projects into said chamber constituting said pressure reservoir, and a guide rod secured on said roll membrane, said guide rod is displaceably disposed in said guide tube means.

* * * * *